United States Patent [19]

Fuchs et al.

[11] Patent Number: 5,321,227
[45] Date of Patent: Jun. 14, 1994

[54] METHOD AND APPARATUS USING A LASER BEAM TO DEEPLY CUT A MATERIAL COVERING A SUBSTRATE

[75] Inventors: Gilles Fuchs, Saint Aubin du Medoc; Patrick Baraer, Pacy/Eure, both of France

[73] Assignee: Societe Nationale Industrielle et Aerospatiale, Paris, France

[21] Appl. No.: 917,326

[22] Filed: Jul. 23, 1992

[30] Foreign Application Priority Data

Jul. 26, 1991 [FR] France .................................. 91 09834

[51] Int. Cl.⁵ .............................................. B23K 26/00
[52] U.S. Cl. ............................ 219/121.68; 219/121.73
[58] Field of Search ...................... 219/121.68, 121.69, 219/121.8, 121.81, 121.73, 121.74, 121.78, 121.79

[56] References Cited

U.S. PATENT DOCUMENTS

| | | | |
|---|---|---|---|
| 3,597,579 | 8/1971 | Lumley | 219/121.69 |
| 4,356,375 | 10/1982 | Josephy et al. | 219/121.68 |
| 4,456,812 | 6/1984 | Neiheisel et al. | 219/121.69 |
| 4,802,729 | 2/1989 | Rivoallan et al. | 350/96.21 |
| 4,861,964 | 8/1989 | Sinohara | 219/121.68 |
| 4,865,686 | 9/1989 | Sinohara | 156/643 |
| 4,931,616 | 6/1990 | Usui et al. | 219/121.68 |
| 4,970,366 | 11/1990 | Imatou et al. | 219/121.68 |
| 5,103,074 | 4/1992 | Watanabe et al. | 219/121.68 |

FOREIGN PATENT DOCUMENTS

| | | | |
|---|---|---|---|
| 0233091 | 8/1987 | European Pat. Off. | |
| 0045487 | 2/1987 | Japan | 219/121.68 |
| 1309794 | 12/1989 | Japan | |
| 66978 | 2/1973 | Luxembourg | |
| 1440022 | 6/1976 | United Kingdom | |
| 2214360 | 8/1989 | United Kingdom | |

OTHER PUBLICATIONS

William Iceland, Rockwell International Corp. "Laser Wire Stripping: Equipment and Operation Notes," Insulation/Circuits, Apr. 1980, pp. 47–50.
Patent Abstracts of Japan, vol. 14, No. 107 (M-942) (4050), Feb. 27, 1990.
French Search Report and Annex.

*Primary Examiner*—C. L. Albritton
*Attorney, Agent, or Firm*—Sandler, Greenblum & Bernstein

[57] ABSTRACT

Process and apparatus for deep cutting a material covering a substrate, the material absorbing laser radiation, enables the transforming of a beam from a laser source into a thin pencil of rays to create a focussing field having a thin blade shape including a large focussing depth spanning several millimeters and having variations in energy density of laser radiation less than a predetermined value so that the laser radiation is sufficient to remove an entire thickness of the material, by fusion or ablation, within the focussing field. The focussing field and the material are movable relative to each other to expose varying portions of the material to the focussing field while maintaining the focussing field substantially perpendicular to an external surface of the material or to a generating line of the external surface of the material. The invention is directed to sheets, coatings, sheaths and similar forms, and the substrate can be made of a material which reflects the radiation, and is especially applicable for stripping electrical cables.

25 Claims, 3 Drawing Sheets

FIG_1_

FIG_2_

FIG_3_

METHOD AND APPARATUS USING A LASER BEAM TO DEEPLY CUT A MATERIAL COVERING A SUBSTRATE

FIELD OF THE INVENTION

The present invention concerns the deep cutting of a material covering a substrate to be effected by a laser beam and more specifically said material absorbing the laser radiation and coating a substrate possibly able to reflect this radiation and more particularly, although not exclusively, concerns the stripping of cables.

Cables in this document are understood to be all electric, single-wire, multi-wire, shielded or non-shielded conductors.

BACKGROUND OF THE INVENTION

Apart from other industries, the aerospatial industry uses large quantities of cables for controls and electric linkings and in particular for supersheathed shielded cables constituted by a plurality of electric conductors insulated by a lateral sheathing. These conductors, placed beside each other in a bundle, are surrounded by a shielding covered with a nonconductive protective sheath.

So as to be able to use and connect these conductors, it is necessary to expose their extremities. This stripping operation mainly consists of removing over a certain length the outer protective sheath of the cable so as to reveal the extremity of the shielding without damaging it.

Currently known stripping devices, whether they be thermic or mechanical, are not satisfactory.

Automatic knife-shaped strippers marrying the geometry of cables are not applicable to cables not having any symmetry of revolution, such as twisted shielded cables, and for which only the manual scalpel is acceptable. However, this scalpel technique is primitive, takes time and rapidly becomes restricting as soon as the cabling volume becomes significant and is random in that it is dependent on the skill of the operator, involves systematic quality control and nevertheless results in a considerable volume of waste.

The risk of cable damage may be reduced by the use of thermic strippers which are particularly effective for fine round conductors.

However, these tools are slow and require an accurate calibration of the heating electrodes whose temperature and cleanliness need to be frequently controlled. Unfortunately, this method is unsuitable for polyimide films not having any melting point. The same applies to certain nonconductors which have a tendency to adhere to the conductor wires after heating.

Moreover, the laser is also used for attacking by means of ablation the outer sheath of a cable, that is by heating and then vaporizing the absorbant material. The absence of any contact between the cutting device and the cable makes it possible, should the operating ranges permit it, to envisage good reproducibility of the stripping operation, the result being completely dissociated from the skill or knowhow of operators.

There are currently a number of machines able to cut the outer nonconductor by means of a laser beam.

This method functions for a single circular cable with a constant thickness. The principle is based on the focussing of the beam by acting on the reflection indices of the existing materials, as well as on the wavelengths they are able to absorb.

The action of the laser beam is limited to the focussing zone whose dimensions are too restricting for taking into account coating profile variations so that, in the case of cables or conductors having no symmetry of revolution, the stripping of the outer sheath is unhomogeneous.

Unfortunately, a large number of cables used in the aeronautical and spatial industries are not cylindrical and have unhomogeneous shapes and particular shieldings and nonconductors.

Thus, there is a need to develop a new stripping principle able to be applied to all types of cables and responding to the essential requirement of full quality. Namely, the clear and clean cutting without damaging subjacent films and able to fully automate cables, except for their placing and removal.

SUMMARY OF THE INVENTION

The object of the invention concerns a new laser stripping technique satisfying the above-mentioned aims.

More generally, the invention concerns a new cutting method by using a laser beam able to slit via ablation or local fusion, a material absorbing the laser radiation and coating a substrate possibly able to reflect this radiation cleanly and clearly for a slitting depth much greater than the penetration depth of known laser cutting devices without damaging the substrate.

To this effect, the invention concerns a method for the deep cutting by means of a laser beam of a material covering a substrate, the material absorbing the laser radiation and appearing in the form of a sheet, coating, sheath or similar shape with the substrate being made of a material to possibly reflect this radiation, wherein it consists of:

transforming the beam ejected from the laser source into a thin pencil of rays so as to create a focussing field with a shape of a thin blade and having a large focussing depth able to attain several millimeters and inside which the variations of the energy density of the laser radiation are smaller than a predetermined value, sufficient to result in removal of the entire thickness of the material by means of fusion or ablation, and, by means of a relative movement between said focussing field and the material to be cut, having the entire thickness of the latter run off into the focussing field whilst keeping this field approximately perpendicular to the external surface or to a generating line of the external surface of the material.

During this cutting, the focussing field acts like a heating blade penetrating via evaporation or fusion into the entire thickness of the material to be cut so as to embody a clear clean cutting without damaging the substrate.

The invention is applicable to the cutting of a material with the shape of a sheet or coating with a thickness of several tenths of millimeters. As well as a few millimeters, covering a substrate with a flat, concave or convex surface.

The invention is of course applicable to the stripping of cables and in this application the cable to be stripped is driven in rotation by at least one revolution around an axis merged with its general axis or parallel to this axis and orthogonal to the plane of the fictive thin blade constituting or delimiting the focussing field so as to have run off the entire section of the material to be cut inside the focussing field.

The invention also concerns a device to implement the method mentioned above and including a laser source generating a beam of parallel rays with radiant energy extending along a particular axis, wherein it further comprises an optical cylindrical lens with an axis perpendicular to the axis of the incident laser beam with a suitable focal length and transforming the laser beam into the thin pencil of rays, the general plane of the fictive thin blade delimiting the focussing field being merged with the general plane of the beam in the shape of a pencil of rays and means to drive the cable to be stripped in rotation at least once around an axis orthogonal to the plane of the focussing field, and so as to have the entire section of the outer sheath of the cable run off into the focussing field.

The cylindrical lens has a preferably large focal length so as to obtain a high focussing depth in the focussing field and able to reach several millimeters.

If the diameter of the ejected laser beam is not sufficient and smaller than the width taken perpendicular to a generating line of the cylindrical lens, an optical system is provided upstream of the cylindrical lens, the optical system being intended to widen the incident beam and constituted for example, by one divergent optical lens and one convergent optical lens for rectifying the beam enlarged by the divergent lens and provide it with a diameter equal to the width, in the sense defined above, of the cylindrical lens.

The laser source may be a carbon dioxide source with a power of 10 watts and sufficient for the stripping of cables of those types used in the aeronautical and spatial industries.

This device is able to be used for the stripping of any cable and, in particular, for twisted shielded cables or other similar cables with an external profile not having any symmetry of revolution to the extent that the sheath or external casing is able to be removed by ablation or fusion under the action of a laser beam. This device is able to be used for the stripping of a cable whose coating subjacent to the external sheath is made o: a material reflecting the laser radiation and also for the stripping of cables with a non-reflecting subjacent coating, either fully or locally with regard to the radiation due to the fact that the ablative or fusion power of the laser radiation is concentrated on the external sheath and insufficient to attack the subjacent coating.

According to the above-mentioned principle, a stripping device is provided which is able to generate a beam with the shape of a thin pencil of rays having a roughly rectangular section 14 mm long and 0.2 mm wide and creating an active or effective zone known as the focussing field where ablation or fusion by the laser radiation of the material of the sheath to be removed is clean and clear, the focussing field having the shape of a thin blade whose general plane is merged with that of the thin pencil of rays, the general plane of the field being perpendicular to the axis of the cable and extended by several millimeters and inside which the variations of the energy density of the laser radiation do not exceed 30%.

This device is able to cut sheaths possibly having a thickness of several millimeters, irrespective of the diameter of the cable, to the extent that it is possible to have the cable rotate around an axis, possibly that of the cable, perpendicular to the plane of the thin blade delimiting the focussing beam and so that the entire thickness of the sheath runs off into the field, that is with this condition that, during one complete rotation around the axis of rotation, those portions of the sheath nearest to and most distant from the axis of rotation pass into the focussing field.

BRIEF DESCRIPTION OF THE DRAWINGS

Characteristics and advantages of the invention shall appear more readily from a reading of the following description of one preferred embodiment of the device of the invention, given solely by way of example, with reference to the accompanying drawings in which.

DETAILED DESCRIPTION OF THE PREFERRED EMBODIMENTS

Figure 1:
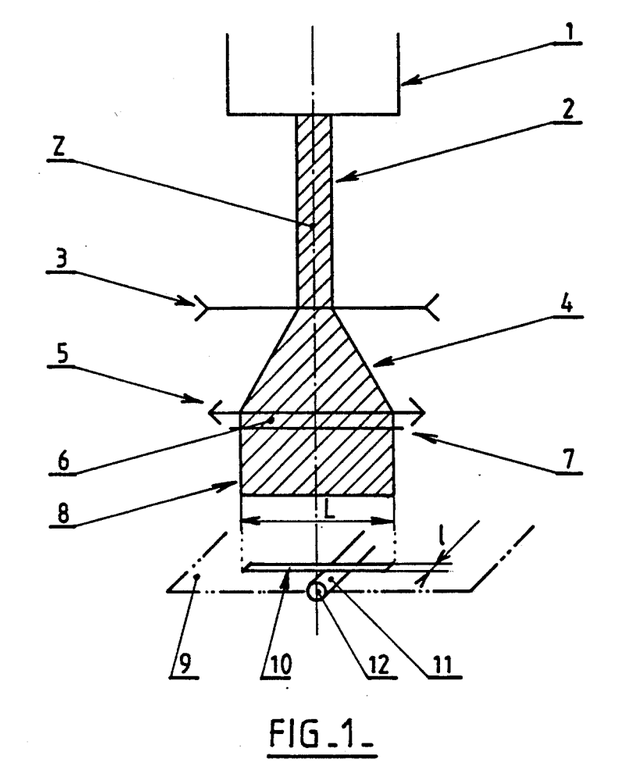
FIG. 1 is a diagram showing one embodiment of the method of the invention.

FIG. 1 diagramatically shows at 1 a carbon dioxide laser source generating a beam 2 with parallel rays with radiant energy extending along a particular axis.

The laser may emit a wavelength of 10.6 micrometers, the ejected beam 2 being cylindrical and having a diameter of 4 mm.

The ejected beam 2 is enlarged with the aid of a divergent lens 3 with a focal length of $-23$ mm and then the enlarged beam 4 is rectified and rendered cylindrical with the aid of a convergent lens 5 with a focal length of $+150$ mm and finally the rectified beam 6 is flattened with the aid of a cylindrical lens 7 with a focal length of $+100$ mm along a thin pencil of rays 8 with a roughly rectangular section.

To this effect, the cylindrical lens 7 is disposed with its flat face perpendicular to the incident beam 6 and the thin pencil of rays 8 is focussed inside the focussing field 9 of the optical system 3-5-7 according to a focussing spot 10 with the general shape of a rectangle and having one major axis of length L parallel to a generating line of the cylindrical lens 7, for example equal to 14 mm, and one small axis of width 1 equal, for example, to 0.2 mm.

The characteristics (dimensions and focal lengths) of the lens 3-5-7 are determined so as to form a thin pencil of rays 8 with a section measuring 14 mm $\times$ 0.2 mm whose dimensions have been deemed sufficient so as to deal with various diameters of the cable to be stripped which are likely to be encountered.

The lenses 3 and 5 are only necessary if the diameter of the ejected beam 2 of the laser source 1 is insufficient. If sufficient, the cylindrical lens 7 is placed directly in the beam ejected from the laser source and the thin pencil of rays 8 shall have a major axis L equal to the diameter of the ejected laser beam.

The conductor to be stripped 11 is, for example, placed with its axis 12 inside the focussing plane 9 and perpendicular to the major axis L of the focussing spot.

Figure 2:
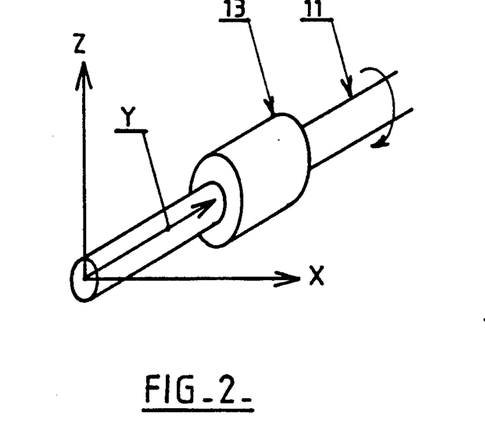
FIG. 2 is a diagram illustrating the means for the positioning and movement of a cable to be stripped concerning the embodiment of FIG. 1, FIG. 3 diagrammatically shows the focussing field inside the plane XOZ of the device of FIG. 1.

The major axis L, the axis Z and the axis of the cable 11 define an orthostandardized referential system XYZ, as shown on FIG. 2.

The cable 11 to be stripped is kept coaxial to the axis Y and in addition is driven in rotation around this axis.

FIG. 2 diagrammatically shows by the reference 13 means able to support the cable, for example, a conventional self-adaptable clamping nozzle, associated with means, such as an electric step motor, for driving the cable 11 around its axis.

These means 13 are mounted on a displacement system at XYZ (not shown) making it possible to have the axis of the cable 11 coincide with the axis Y of the referential system XYZ, the portion of the outer sheath of the cable to be removed being located inside the central portion of the beam 6.

Following tests with polyimide sheaths able to ablate, a clear clean cutting of the cable resulted in causing an instantaneous evaporation of the sheath at the point of the cutting.

This evaporation requires an energy quantity per large surface unit (energy density).

The method of the invention, with one embodiment being illustrated in FIG. 1, makes it possible to apply to the entire entire thickness of the sheath to be cut, whether the cable has a regular section or not, the energy required to remove, fuse or ablate the constitutive materials of the cable to be stripped in accordance with the invention.

Figure 3:
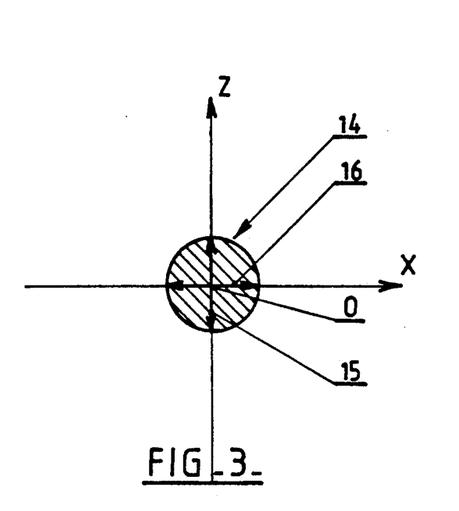

FIG. 3 shows at 14 a zone situated inside the plane XOZ and centered at 0, the intersection of the axis Z of the beam 8 and the axis of the cable to be stripped.

The maximum power of the beam is available at 0 and the zone 14, known as the focussing field, corresponds to the points of the space where the energy locally provided by the beam does not undergo any significant variation.

The field 14 is characterized by a field depth along the axis Z which depends directly on the focal lengths of the optical elements 3, 5 and 7. This field depth symbolized at 15 in FIG. 3 may attain about 3 mm.

The field 14 also offers one degree of freedom along the axis X and symbolized at 16 and may attain 3 mm.

Finally, the field 14 has a certain thickness along the axis Y and corresponds to the width 1 of the beam 8.

The degree of freedom 16 corresponds to the central portion of the focussing spot 10.

Having regard to the power (10 watts) of the laser 1 used, the characteristics of the cables to be stripped and the need to possibly have an ablation of the material of the sheath by means of instantaneous evaporation, the energy variation limit has been fixed at 30%.

Beyond the field 14, the energy provided by the laser can result in a cutting that lacks quality.

Of course, this value of 30%, determined experimentally concerning aerospatial cables, depends on various parameters, such as the power of the laser, the focal lengths of the elements of the optical system 3,5,7, the characteristics of the cables (composition, configuration), and the desired quality of cutting.

Figure 4:
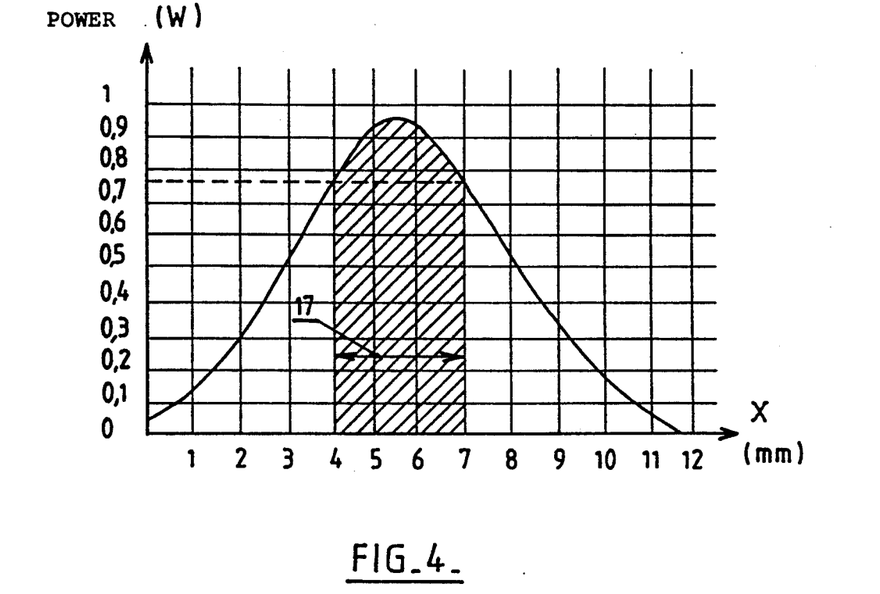
FIG. 4 is a curve illustrating the spatial distribution of the focussing spot of the beam of the device.

FIG. 4 shows the spatial distribution of the focussing spot and the variations of the power of the beam 8 along the major axis L of the spot 10.

Concerning this curve, if it is desired to remain inside the maximum power zone of the beam 8, and more specifically remain just short of an energy density variation of 30% with respect to the maximum density available at the center of the spot 10, it is necessary for it not to be distanced by more than 1.5 mm on both sides of the center. Thus, an "effective" central portion 17 of 3 mm is obtained which corresponds to the degree of freedom of the "effective" field 16 of FIG. 3.

The method of the invention therefore consists of creating this focussing field 14 inside which the energy density does not vary by more than 30% and of having run off inside the field 14 the entire section of the cable to be stripped by driving the cable in rotation around the axis 0 at least by one full revolution by using the means 13.

The number of rotations and the speed of rotation controlling the exposure time of the coating to the beam 8 are determined according to the characteristics (materials and configuration) of the cable.

With a focussing field 14, including its extension as shown on FIG. 3, of several square millimeters, it is possible to strip from the cables 11 (with a circular or complex section) a maximum diameter of about 3 mm by making the cables pivot around their axis and by keeping this axis merged with the axis OY of the reference system XOZ irrespective of the thickness of the outer coating to be cut.

Figure 5:
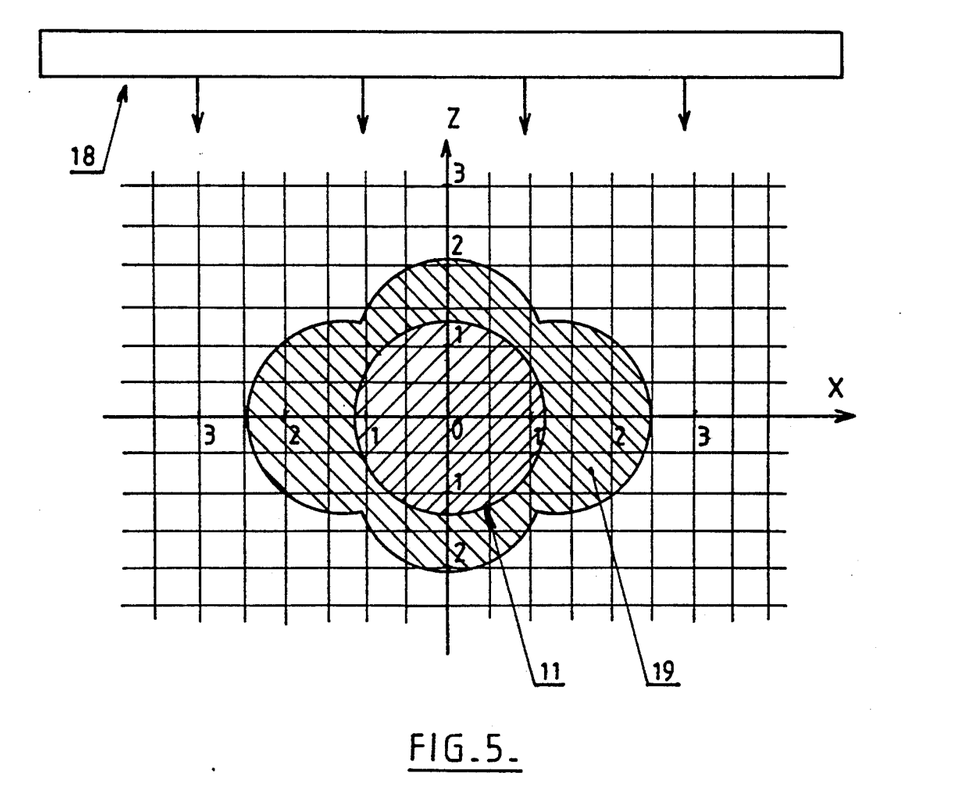
FIG. 5 shows the theoretical degree of freedom of the cable to be stripped in the plane XOZ.

FIG. 5 shows the theoretical degree of freedom of the cable to be stripped in the plane XOZ for a stripping quality satisfying the criteria mentioned above.

This figure shows at 18 the beam 8 with the axis Z, the nominal position of the cable (cylindrical) at 11, and at 19 the halo surrounding the cable symbolizing the positional deviations able to be tolerated for the cable with respect to the center 0 along the axes X and Z.

The contour of the halo 19 has been determined by calculations indicating that a variation of ±1 mm only results in a reduction of 10% of the effective power of the laser beam and that a variation of ±2.5 mm (corresponding to the diameter of the cable 11 of FIG. 5) only results in a reduction of 30% of the effective power.

In fact, FIG. 5 demonstrates that the position of the cable inside the focal plane 9 is not critical, a variation of ±1.5 mm being acceptable with the optical mounting of FIG. 1.

Of course, the device of the invention is able to suitably be applied to cables with a circular or complex section and having a diameter of more than 3 mm, provided the cable is preferably made to pivot around its axis whilst keeping this axis of rotation parallel to the axis OY of the stripping device and at a certain distance from the latter so that the entire section of the sheath to be removed runs off into the focussing field 14 during one complete rotation.

If the cable is cylindrical with a constant sheath thickness, the device, such as the one shown in FIG. 1, could cut sheaths with a thickness possibly ranging up to about 3 mm.

Figure 6:
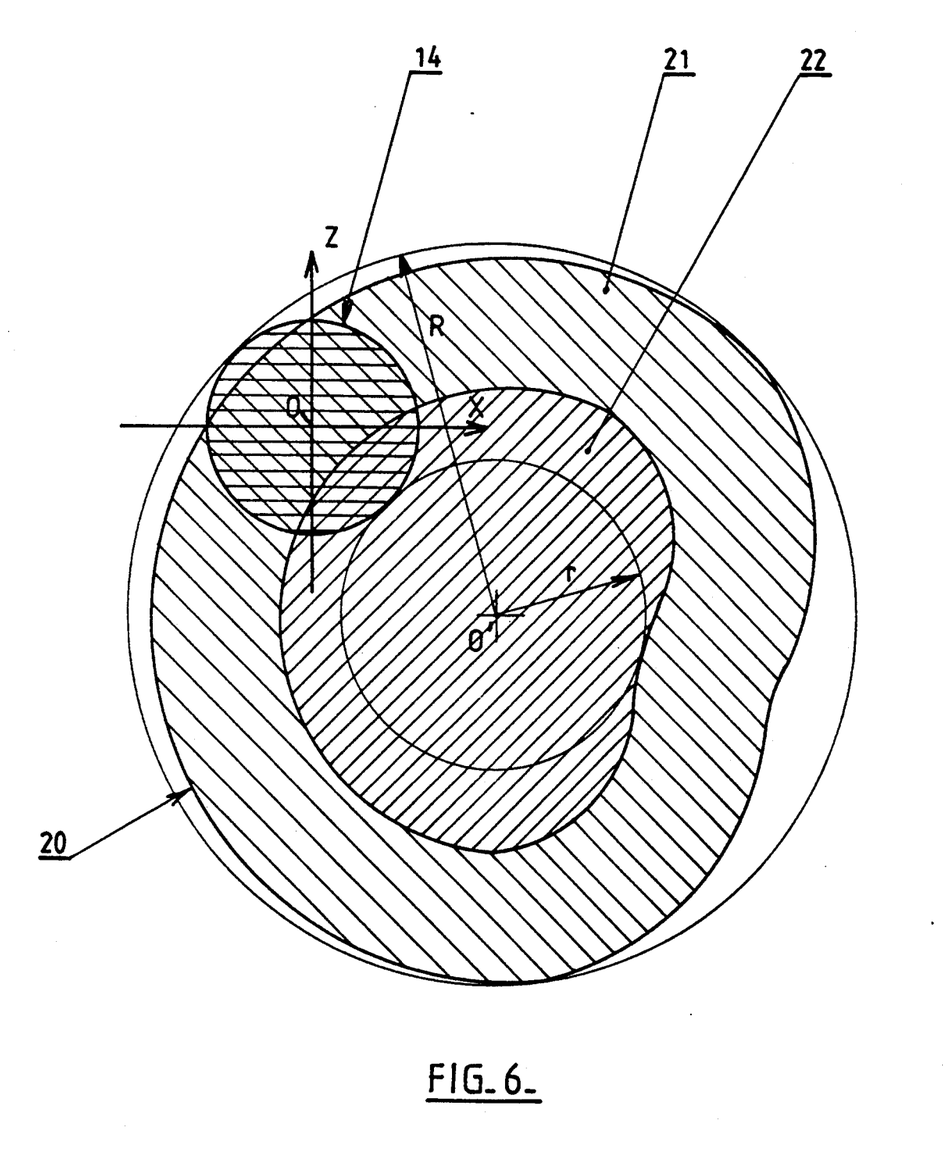
FIG. 6 is a diagram showing the practical conditions of use of the stripping device.

If the cable has a complex section, it would be necessary to take account of the conditions shown in FIG. 6.

This figure shows at 14 the "effective" focussing field of the stripping device, and at 20 a cable whose profile has no symmetry of revolution. The cable 20 includes one external sheath 21 with a constant thickness which covers, for example, a set of conductors 22 surrounded with a shielding.

The axis of rotation of the cable at the time the latter is stripped is indicated at 0' and is parallel to the axis OY.

This axis 0' defines a maximum radius R distanced from the sheath 21 and a minimum radius r close to the coating. The two circles with the radii R and r delimit between them an annular area which, along with the area of the field 14, shall have one common portion extending from one circle to the other.

FIG. 6 shows the maximum thickness of the sheath 21 having regard to the particular profile where it is possible to clearly and cleanly cut the sheath with the stripping device of the invention, the field 14 being inscribed between the two circles with radii R and r.

Thus, when the cable 20 has made one complete rotation around the axis 0', the entire section of the sheath 21 will have run off into the field 14.

The method of the invention is able to be used for the stripping of nearly all conductors currently existing on the market, namely, monofilar, bifilar, and trifilar conductors, whether they be twisted or shielded or not twisted or shielded, and with a profile possibly having a symmetry of revolution, as well as for the stripping of elementary wires.

For a given criterion (30%, for example) of the admissible energy variation of the available radiation the dimensions of the field 14 may of course, vary according to the power of the laser source 1 and the focal lengths of the optical system and in particular that of the cylindrical lens 7. The shorter the focal length of the lens 7 is, the less shall the field 14 be dilated in the direction OZ.

The presence of the cylindrical lens makes it possible to obtain a focussing field 14 with a depth (15) much larger than that of the fields of known laser cutting systems which are unable, as mentioned earlier, to cut clearly and cleanly in suitable conditions, without damaging the subjacent substrate, the sheaths of cables, not merely with sections having no symmetry of revolution but even with single cables a regular cirular section.

The method of the invention is applicable to the stripping of cables whose substrate subjacent to the external sheath is made of a material reflecting the laser radiation, as well as to the stripping of cables with the subjacent substrate made of a full or local non-reflecting material with regard to the radiation owing to the ablative or fusion energy of the laser radiation able to be concentrated on the thickness of the sheath to be removed, this energy being insufficient beyond the sheath so as to attack the subjacent film.

Of course, the invention is applicable to the window cutting on cables, that is to stripping outside the extremities.

It is to be noted that the device of the invention may advantageously be automated, the stripping operations being reliable and able to be reproduced. It merely suffices to provide the device with a programmable microprocessor enabling various parameters relating to a given type of cable to be stripped to be introduced (nature, thickness, homogeneity of the sheath to be cut, surface of the focussing spot 10 on impact, speed of rotation of the cable and number of rotations, power of the emitted beam 8).

Although described in its main application for the stripping of cables, the method of the invention may generally be applied for cutting by ablation or the local fusion of a sheet, coating or similarly shaped element covering a substrate possibly able to reflect this radiation.

This material to be cut, for example, in order to gain access to the subjacent substrate, could be a sheet with a thickness of between several tens of millimeters and several millimeters and could be flat, concave, convex or have a complex shape. The method of the invention makes it possible to cut this sheet with the aid of a device, such as the one formed by the laser source 7 and the optical system 3, 5,7 which would be moved above and at a specific distance from the surface of the sheet in the manner of a lancet, the general plane of the thin blade fictively delimited by the focussing field 14 being kept approximately perpendicular to the plane of the surface or to a generating line of the latter.

Finally, the invention is not merely limited to the embodiment described above, but covers all possible variants, especially as regards the structure of the optical system to the extent that the same enlarged focussing field effects are embodied, as illustrated in FIG. 3.

Similarly, types of laser sources, than the one described above, may also be used.

What is claimed is:

1. Process for deep cutting a material covering a substrate, the material absorbing laser radiation, comprising:

transforming a beam from a laser source into a thin pencil of rays to create a focussing field having a thin blade shape including a large focussing depth spanning several millimeters and having variations in energy density of laser radiation less than a predetermined value so that the laser radiation is sufficient to remove an entire thickness of the material, by diffusion or ablation, within the focussing field; and moving the focussing field and the material relative to each other to expose varying portions of the material to the focussing field while maintaining the focussing field substantially perpendicular to an external surface of the material or to a generating line of the external surface of the material.

2. The process according to claim 1, wherein said transforming comprises passing a beam of parallel rays from a laser through a cylindrical optical lens which is perpendicularly positioned with respect to the beam of parallel rays.

3. The process according to claim 1, comprising passing a beam of parallel rays from a laser through an optical system for enlarging and forming a cylindrical beam of the beam from the laser, and passing the cylindrical beam through a cylindrical optical lens.

4. The process according to claim 3, wherein the optical system comprises divergent and convergent lenses.

5. The process according to claim 1, wherein the substrate and material comprise a cable having an external sheath portion to be stripped, and wherein the moving of the focussing field and the material relative to each other comprises rotating the cable through at least one revolution around an axis orthogonal to a longitudinal plane passing through the focussing field to expose an entire external sheath portion to be stripped to the focussing field as the cable is rotated.

6. The process according to claim 5, wherein the external sheath portion to be stripped comprises a section of the external sheath located between extremities of the cable, and the section is rotated within the focussing field.

7. The process according to claim 6, wherein the focussing field has a substantially rectangular section.

8. The process according to claim 7, wherein the substantially rectangular section is about 14 mm by 0.2 mm.

9. The process according to claim 1, wherein the variations in energy density of laser radiation less than a predetermined value comprise an energy variation limit of 30%.

10. The process according to claim 1, wherein the material comprises a sheet, coating, or sheath.

11. The process according to claim 1, wherein the substrate is reflective to laser radiation.

12. Apparatus for deep cutting a material covering a substrate, the material absorbing laser radiation, comprising:
- first means for transforming a beam from a laser source into a thin pencil of rays to create a focussing field having a thin blade shape including a large focussing depth spanning several millimeters and having variations in energy density of laser radiation less than a predetermined value so that the laser radiation is sufficient to remove an entire thickness of the material, by fusion or ablation, within the focussing field; and
- means for moving the focussing field and the material relative to each other to expose varying portions of the material to the focussing field while maintaining the focussing field substantially perpendicular to an external surface of the material or to a generating line of the external surface of the material.

13. The apparatus according to claim 12 including a laser generating source generating a beam of parallel rays having radiant energy extending along a first axis.

14. The apparatus according to claim 13, wherein said first means for transforming comprise a cylindrical optical lens having an axis perpendicular to said first axis.

15. The apparatus according to claim 14, including an optical system positioned between said laser source and said cylindrical lens for enlarging and forming a cylindrical beam of the beam from said laser source.

16. The apparatus according to claim 15, wherein said optical system comprises divergent and convergent lenses.

17. The apparatus according to claim 12, wherein the substrate comprises a cable having an external sheath portion to be stripped, and wherein said means for moving comprise means for rotating the cable through at least one revolution around an axis orthogonal to a longitudinal plane passing through said focussing field to expose an entire external sheath portion to be stripped to said focussing field as the cable is rotated.

18. The apparatus according to claim 17, wherein the external sheath portion to be stripped comprises a section of the external sheath located between extremities of the cable, and said means for rotating are capable of rotating the section within said focussing field.

19. The apparatus according to claim 17, wherein said means for rotating comprise a self-adaptable device for clamping the cable to be stripped associated with an electric motor for rotating the cable in rotation around a longitudinal axis of the cable.

20. The apparatus according to claim 19, wherein said means for rotating are mounted on a movable plate which is adjustable with respect to three orthogonal axes, one of the three orthogonal axes comprising a longitudinal plane passing through said thin blade shape focussing field.

21. The apparatus according to claim 12, wherein said focussing field has a substantially rectangular section.

22. The apparatus according to claim 21, wherein said substantially rectangular section is about 14 mm by 0.2 mm.

23. The apparatus according to claim 12, wherein said variations in energy density of laser radiation less than a predetermined value comprise an energy variation limit of 30%.

24. The process according to claim 7, wherein said focussing field comprises a width of about 3 mm having variations in energy density of laser radiation less than a predetermined value so that the laser radiation is sufficient to remove an entire thickness of the material, by fusion or ablation, within the focussing field.

25. The apparatus according to claim 18, wherein said focussing field comprises a width of about 3 mm having variations in energy density of laser radiation less than a predetermined value so that the laser radiation is sufficient to remove an entire thickness of the material, by fusion or ablation, within the focussing field.

* * * * *

UNITED STATES PATENT AND TRADEMARK OFFICE
CERTIFICATE OF CORRECTION

PATENT NO. : 5,321,227
DATED : June 14, 1994
INVENTOR(S) : Gilles FUCHS et al.

Page 1 of 2

It is certified that error appears in the above-indentified patent and that said Letters Patent is hereby corrected as shown below:

On the title page, item [73];

under Assignee, change "Societe Nationale Industrielle et Aerospatiale" to ---Aerospatiale Societe Nationale Industrielle S.A.---.

At column 2, lines 15 and 16 of the printed patent, change "quality. Namely" to ---quality, namely---.

At column 2, line 47 of the printed patent, change "said" to ---the---.

At column 2, line 60 of the printed patent, change "millimeters. As" to ---millimeters, as---.

At column 3, line 42 of the printed patent, change "o:" to ---of---.

At column 9, line 25 (claim 13, line 1) of the printed patent, change "claim 12" to ---claim 12,--- .

At column 10, line 30 (claim 24, line1) of the printed patent, change "claim 7" to ---claim 1---.

At column 10, line 36 (claim 25, line 1) of the printed patent,

UNITED STATES PATENT AND TRADEMARK OFFICE
CERTIFICATE OF CORRECTION

PATENT NO. : 5,321,227
DATED : June 14, 1994
INVENTOR(S) : Gilles FUCHS et al.

It is certified that error appears in the above-indentified patent and that said Letters Patent is hereby corrected as shown below:

change "claim 18" to ---claim 12---.

Signed and Sealed this

Thirty-first Day of October 1995

Attest:

BRUCE LEHMAN

*Attesting Officer*    Commissioner of Patents and Trademarks